April 2, 1929.                H. M. GODSEY                1,707,302
               PROCESS AND APPARATUS FOR SOFTENING WATER
                         Filed Dec. 10, 1926
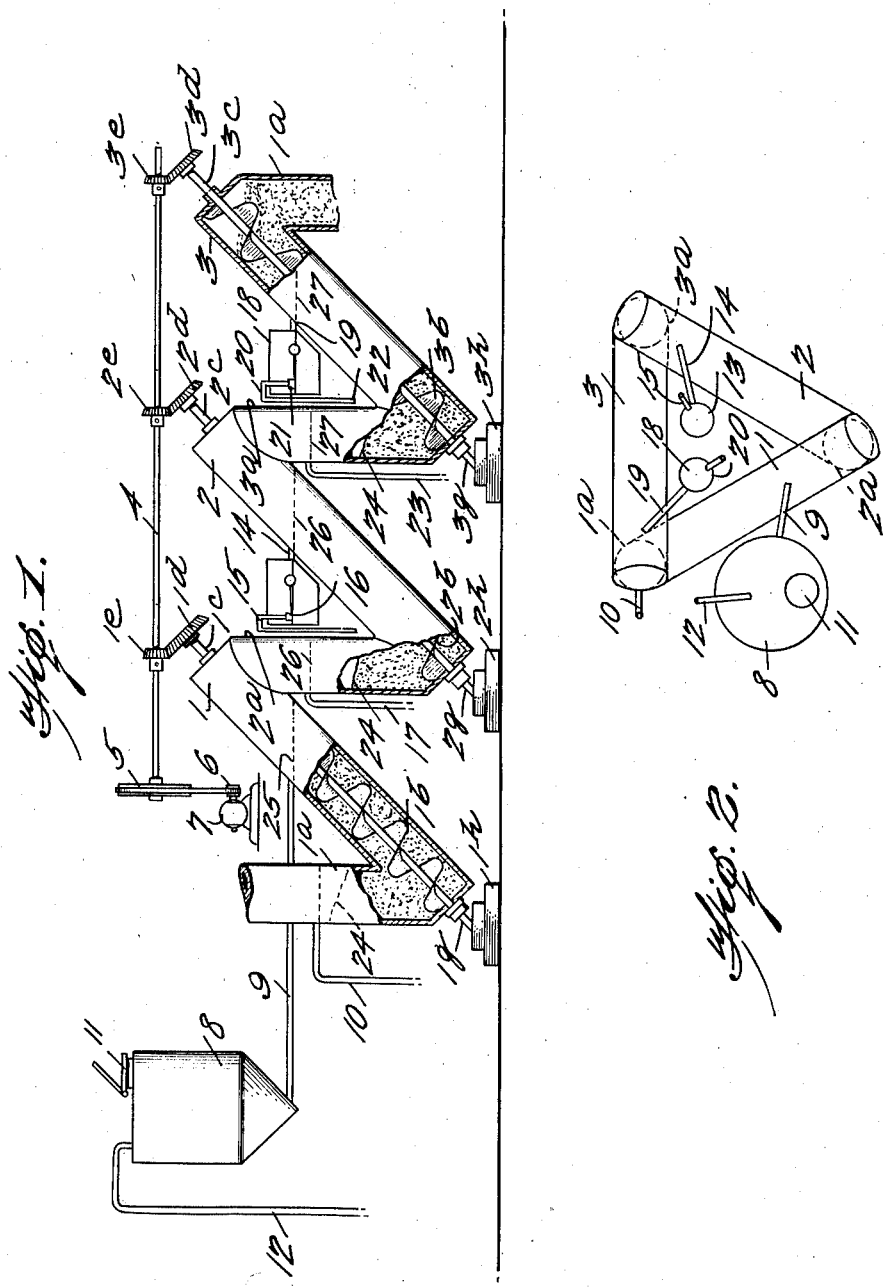
INVENTOR.
H. MITCHELL GODSEY,
BY
                ATTORNEY.

Patented Apr. 2, 1929.

1,707,302

UNITED STATES PATENT OFFICE.

H. MITCHELL GODSEY, OF SHREVEPORT, LOUISIANA.

PROCESS AND APPARATUS FOR SOFTENING WATER.

Application filed December 10, 1926. Serial No. 153,915.

This invention relates to water softeners and in particular to a process and apparatus for softening water utilizing a mineral such as zeolite or zeolitic material.

One of the objects of the invention is to provide a more compact, more economically constructed and larger capacity apparatus than those commonly in use.

Another object of the invention is to provide an apparatus that will be almost automatic in operation and whose operation will be entirely continuous. Other objects and advantages of the invention will become apparent as the description, taken in connection with the accompanying drawing, proceeds.

These processes and apparatus are based on the power of minerals, commonly known as zeolites, base-exchange substances or base-exchange silicates, to absorb from hard water, magnesium and calcium salts until the zeolite or similar substance becomes saturated, then it may be regenerated or reconditioned by passing into intimate contact with it solutions such as a concentrated water solution of sodium chloride. These processes are ordinarily carried out in an intermittent manner by first passing raw water through the zeolite until the zeolite ceases to soften the water, then the zeolite is reconditioned or regenerated by passing a solution of common salt and water through it and afterwards washing away the surplus salt that the zeolite has not absorbed, the chemical reaction being first, the absorption by the zeolite of the magnesium and calcium salts in the hard water, and then, the exchange of these for sodium, these reactions being commonly known as "base exchange water softening".

For purposes of simplicity, the zeolite or base exchange substance will hereinafter be referred to as the mineral, and the solution used for regenerating or reconditioning will be referred to as the reconditioning solution or reconditioning fluid.

In the drawing, Figure 1 is a diagrammatic elevation, partly in section, showing a convenient means by which the processes described herein may be conveniently carried out, while Figure 2 represents a plan of the compact and convenient form in which such an apparatus may be assembled. The reference numerals apply to the two figures in the respective positons of the devices used.

On referring to Figure 1, numerals 1, 2 and 3 are a series of inclined chutes, or tanks, and numerals $1^a$, $2^a$ and $3^a$ are vertical or dumping chutes or tanks, the respective halves of the chute $1^a$ being shown diagrammatically at each end, although these will be arranged in triangular or rectangular form as may be found convenient in practice. $1^b$, $2^b$ and $3^b$ are screw or spiral conveyors, mounted in the inclined chutes on the shafts $1^c$, $2^c$ and $3^c$. These shafts are rotated through large pinion gears $1^d$, $2^d$ and $3^d$ driven by small pinions $1^e$, $2^e$ and $3^e$, which are in turn rotated through horizontal shaft 4, large pulley 5 belted to small pulley 6, driven by the motor 7. Numeral 8 refers to a reconditioning solution hopper or tank which will ordinarily hold salt and water, this being connected by pipe 9 into the inclined chute 1. A pipe 10 is connected to vertical chute $1^a$ for the purpose of withdrawing and disposing of the reconditioning solution. Numeral 12 is a water supply pipe leading into the top of the reconditioning tank or hopper 8 and 11 is a covered opening to admit supplies of salts to make up the solution. Numerals $1^g$, $2^g$ and $3^g$ are water-tight stuffing boxes on the lower end of the inclined chutes, while $1^h$, $2^h$ and $3^h$ are pedestal bases and step bearings for the lower ends of the conveyor shafts. Numeral 13 refers to a receptacle for governing the admission of wash water through pipe 14 into inclined chute No. 2, while 15 is a supply pipe for wash water and 16 is a float valve for ordinarily holding a constant level of water. Numeral 18 is likewise and in the same manner a receptacle for governing the flow of raw water to be softened, connecting into inclined chute 3 by the pipe 19 and is supplied by pipe 20; the float valve 21 ordinarily governs the level of the water therein. Numeral 17 is a drain pipe for wash water from vertical chute $2^a$ and numeral 23 is a discharge line from vertical chute $3^a$ to carry away the softened water. Numeral 24 refers to the approximate level of the mineral carried in each of the vertical chutes, that of $1^a$ being indicated by an irregular dotted line. The straight horizontal dotted lines 25, 26 and 27 respectively refer to the level of the liquids to be carried in the vertical and inclined chutes.

In operation the screw conveyors $1^b$, $2^b$ and $3^b$ are in constant and slow rotation, thereby tending to elevate and discharge the mineral at the tops of all the inclined chutes, dumping it into the vertical chutes, these conveyors to be made exactly the same size and the same pitch, thereby resulting in a constant, continuous and uniform flow of the entire charge of mineral throughout the series of chutes. The reconditioning solution is continuously flowing from container 8 through pipe 9 into inclined chute No. 1, and works its way downward through and in intimate contact with the mineral while the latter is in chute 1, past the screw conveyor—which also acts as a set of baffles in this instance—thence upward through the mineral that is continuously being dumped into the vertical chute 1$^a$ by the conveyor in the inclined chute 3. The solution overflows at some level denoted by numeral 25 into pipe 10 by which it may be disposed of conveniently. The wash water for removing any excess of salt or weak reconditioning solution that may adhere to the mineral after its passage from the reconditioning phase, enters the inclined chute 2 from its supply tank 13 through pipe 14, and its flow may be regulated by hand if it is found desirable to diminish it below the liquid level 26. This wash water flows downward in exactly the same manner as described for that of the reconditioning solution through inclined chute 2 and upward to its overflow level 26 into drain pipe 17, which may be connected into a sewer or other convenient means of disposal, the mineral thereby being thoroughly washed of any undesirable content of reconditioning substance before it is dumped into the next phase. The next phase, or the raw water softening process, is carried out in a similar manner to that of the washing, with the exception that a much greater quantity of water is flowing at all times. The raw water enters the inclined chute 3 at a level 27 from regulating tank 18 through pipe 19, and may be regulated ordinarily by the float valve 21 or by hand if the flow must be diminished. The mineral is carried upward again in the inclined chute 3 and dumps continuously into the vertical chute 1$^a$, thereby completing the cycle and being in position to repeat the cycle of reconditioning, washing and softening continuously and uniformly.

The simplicity of construction and the efficiency of the process and apparatus described are important features of the invention. In the embodiment shown and described herein, provision is made for positive mechanical agitation and circulation of the entire charge of mineral uniformly through the apparatus, thereby attaining uniform results and utilizing the mineral effectively. There is no opportunity for packing or stratification of the mineral and the bodies of raw water and conditioning fluids are kept separate so that mixing of the fluids is prevented, whereas in prior apparatus such stratification often occurred and mixing of the fluids was necessary to accomplish the desired circulation of the mineral.

The foregoing is a description of the apparatus found so far most convenient for carrying out the processes described, but it is apparent that for large capacities and for certain practical and commercial purposes, the apparatus may be varied considerably in detail so as to produce possibly a more economical and compact arrangement than that shown in either of the two figures. It may, on the other hand, be necessary to add, for instance, an additional set of chutes for carrying out the softening phase or it may be desirable to change the form of the dumping chutes or to incline them somewhat. It may also be possible to dispense with the washing phase or carry it out in a manner so as to eliminate a separate set of chutes and conveyors as illustrated and described. It is also apparent that the direction of flow of the fluids for reconditioning, washing or softening may be reversed or operated counter to that described and shown. It is obvious also that some other means of controlling the flow of the fluids and means for regulating the flow of the mineral may be incorporated, and it is also obvious that another means of conveying the mineral may be found feasible and more convenient. It is therefore obvious that the apparatus for carrying out these processes as shown and described are merely of preferred form and construction to illustrate a way in which this invention may be practiced, but the inventive thought upon which this invention is based is broader than the illustrated embodiment thereof and no limitations are intended or therefore should be imposed, and the following claims cover more specifically and broadly what this invention in its entirety constitutes.

I claim:

1. In a cyclic process for softening water by the base exchange method to include reconditioning the base exchange mineral for reuse, comprising continuous mechanical agitation and circulation of the entire charge of base exchange mineral uniformly through the phases of the process, flowing raw water through the mineral in one phase and reconditioning the exhausted mineral in another phase.

2. In a cyclic process for softening water by the base exchange method to include reconditioning the base exchange mineral for re-use, comprising continuous mechanical circulation of the entire charge of base exchange mineral uniformly through the phases of the process, flowing raw water through the mineral in one phase and reconditioning the exhausted mineral in another phase.

3. In apparatus for softening water by the base exchange method, an endless conduit constructed of serially related sections of substantially uniform cross-section, means for moving the entire charge of base exchange mineral in a stream through said conduit and means to supply raw water to be softened to the stream in one section of the conduit and reconditioning fluid to the stream in another section.

4. In apparatus for softening water by the base exchange method, an endless conduit constructed of serially related sections, screw-conveyor means in each section for moving the base exchange mineral in a stream through said conduit, means for actuating the screw-conveyor means and means for supplying raw water to be softened to one section and reconditioning fluid to another section.

5. In apparatus for softening water by the base exchange method, serially related screw conveyors for moving the charge of base exchange mineral in a stream through the apparatus, means for actuating the screw conveyors and means for supplying raw water to be softened to one portion of said stream and reconditioning fluid to another portion thereof.

6. In apparatus for softening water by the base exchange method, serially related mechanical agitating and conveying elements for moving the charge of base exchange mineral uniformly in a stream through the apparatus and means for supplying raw water to be softened to one portion of said stream and reconditioning fluid to another portion thereof.

7. In apparatus for softening water by the base exchange method, serially related mechanical agitating and conveying elements for moving the charge of base exchange mineral uniformly in a stream through the apparatus, means for flowing raw water to be softened counter-current to the stream of mineral in one of said agitating and conveying elements and means for supplying reconditioning fluid to another portion of the stream of mineral.

8. In apparatus for softening water by the base exchange method, a plurality of serially related tanks, means for flowing raw water to be softened into one of said tanks and reconditioning fluid for the mineral into another of said tanks and means for lifting the mineral in each tank above the liquid level therein and transferring the same to another of said tanks to provide continuous circulation of the mineral through the apparatus, said lifting and transferring means being arranged to prevent fluid flow between the respective tanks.

9. In apparatus for softening water by the base exchange method, a plurality of serially related tanks, means for flowing raw water to be softened into one of said tanks and reconditioning fluid for the mineral into another of said tanks and for maintaining predetermined liquid levels therein and means for conveying the mineral in each tank above the liquid level therein and then into another of said tanks to provide a continuous circulation of the mineral through the apparatus without mixing of the fluids.

10. In apparatus for softening water by the base exchange method comprising a plurality of conveyor elements connected serially to form an endless system, each element having inlet and discharge passages which are connected with the discharge and inlet passages respectively of the adjacent elements, mechanical means for positively circulating a quantity of base exchange mineral from each element to the succeeding element of the system and means for feeding raw water to the mineral as it is conveyed through one element and a reconditioning fluid to the mineral in another element.

11. In apparatus for softening water by the base exchange method comprising a plurality of conveyor elements connected serially to form an endless closed system, each element consisting of an inclined chute with inlet and discharge passages connecting it to discharge and inlet passages respectively of the adjacent elements, a mechanical conveyor device arranged in each chute to move the mineral therein upwardly, driving connections by which all conveyors are operated at the same uniform speed, means for feeding raw water in regulable amounts into one chute and for withdrawing softened water therefrom and means for feeding in regulable quantity a reconditioning fluid to the mineral in another chute, the relative arrangement of chutes being such that the fluids in the system are maintained in separated zones.

12. In apparatus for softening water by the base-exchange method, mechanical means for continuously agitating and circulating base exchange mineral through the apparatus while maintaining the mineral in definitely separated portions, means for contacting raw water with one portion of the mineral, means for supplying reconditioning fluid to another portion of the mineral and means for preventing fluid flow between the bodies of raw water and reconditioning fluid in the apparatus.

In witness whereof, I have hereunto set my hand and seal this 7th day of December, 1926.

H. MITCHELL GODSEY.